Sept. 6, 1960 R. P. ATKINSON ET AL 2,951,337
TURBINE AIR SYSTEM
Filed May 28, 1957 3 Sheets-Sheet 1
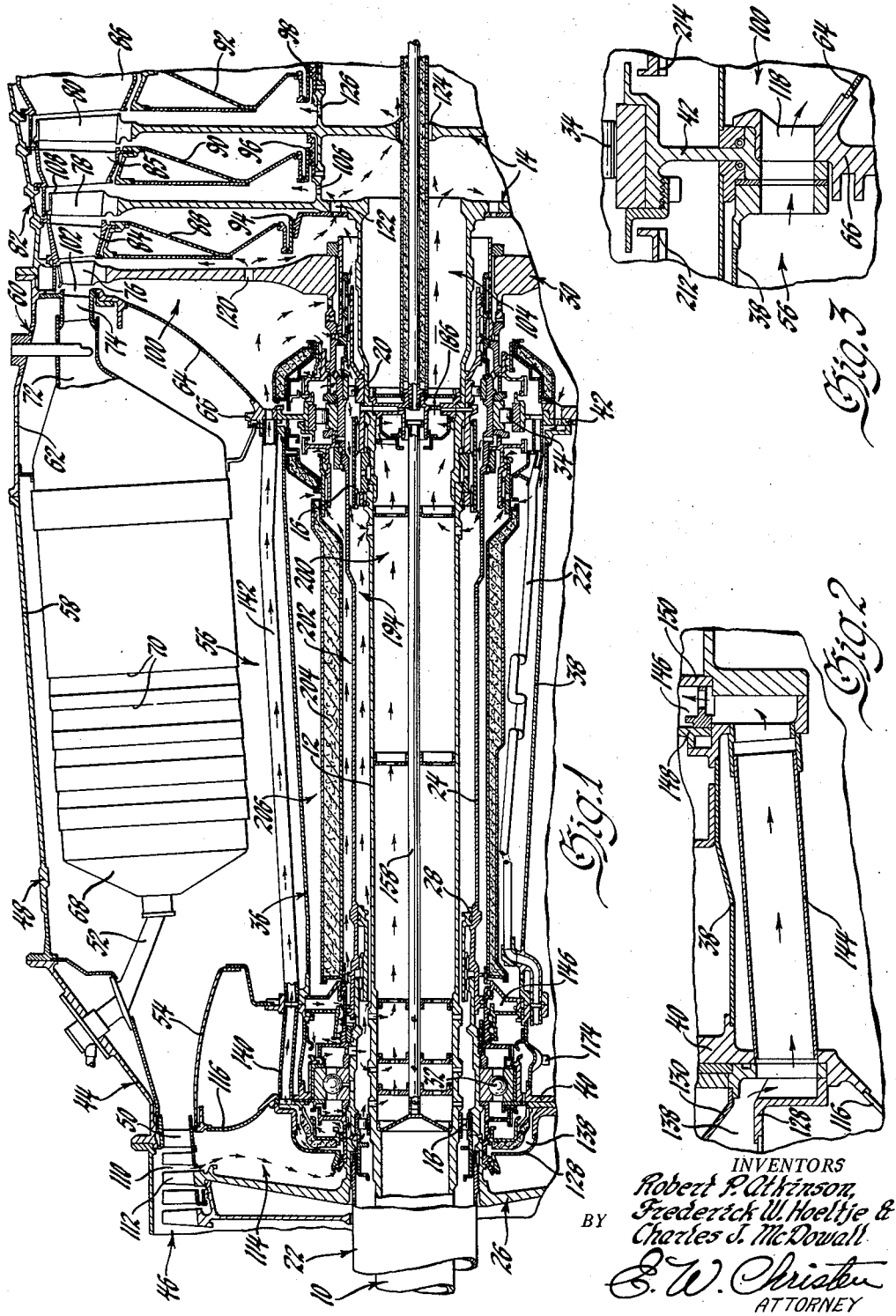
INVENTORS
Robert P. Atkinson,
Frederick W. Hoeltje &
Charles J. McDowall
BY
E. W. Christen
ATTORNEY

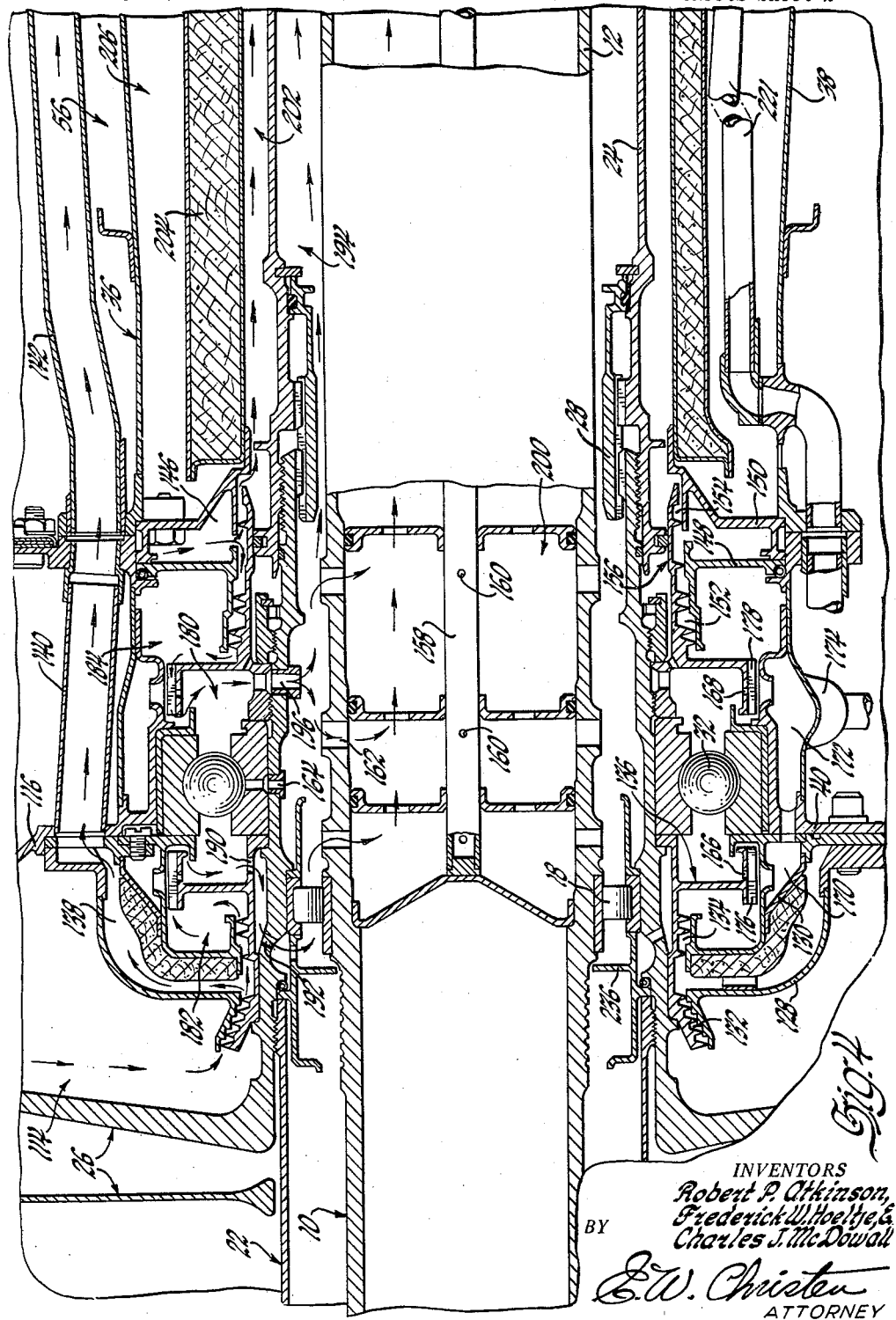

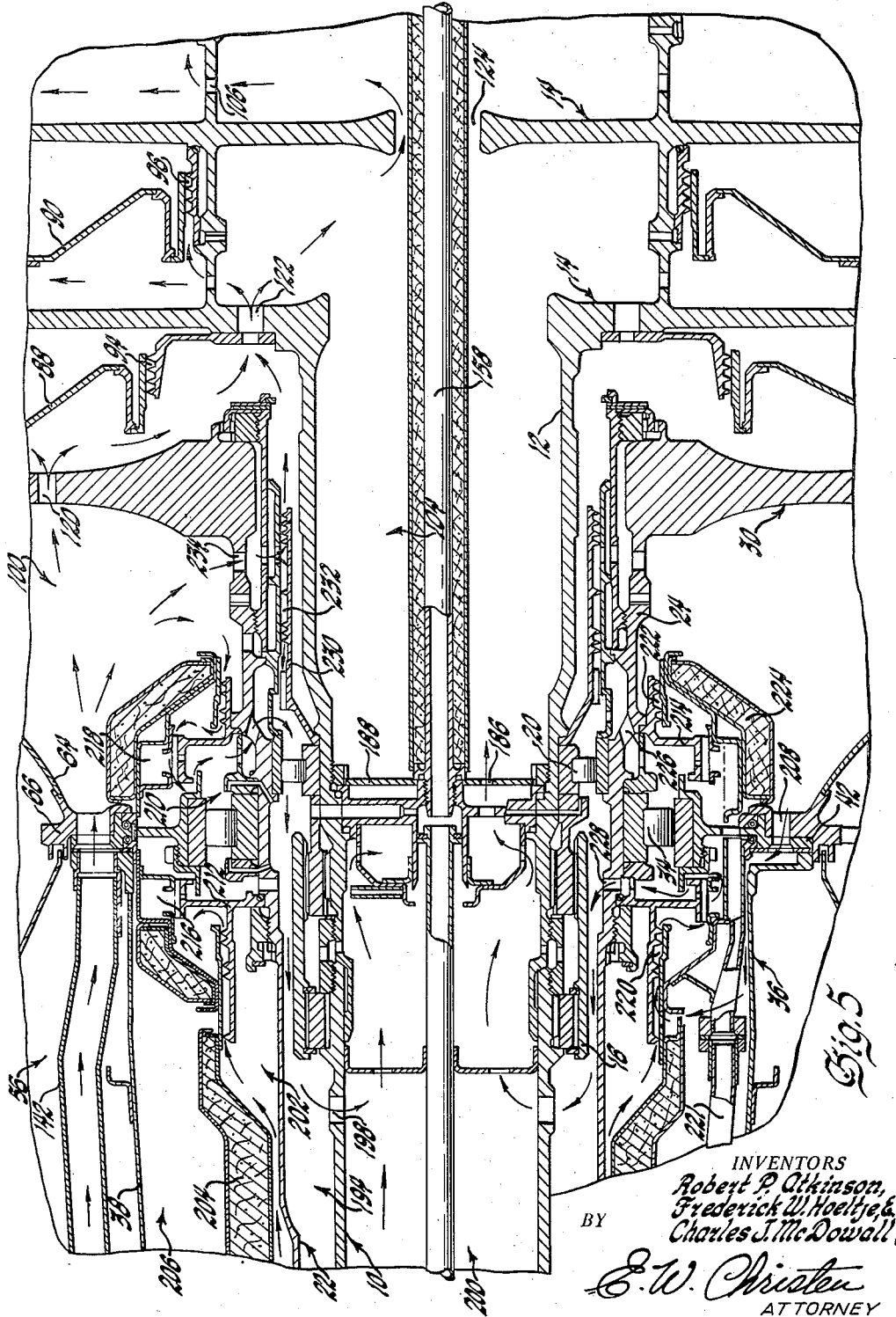

United States Patent Office 2,951,337
Patented Sept. 6, 1960

2,951,337

TURBINE AIR SYSTEM

Robert P. Atkinson, Frederick W. Hoeltje, and Charles J. McDowall, Indianapolis, Ind., assignors to General Motors Corporation, Detroit, Mich., a corporation of Delaware Filed May 28, 1957, Ser. No. 660,502

2 Claims. (Cl. 60—39.08)

This invention relates to gas turbine engines and more particularly to air flow systems for such engines.

The invention is shown in a two-spool engine of the type that comprises a low pressure compressor that feeds a high pressure compressor which discharges into a central combustor that feeds a high pressure turbine which discharges through a low pressure turbine, the low pressure compressor and turbine being connected by one shaft and the high pressure compressor and turbine being connected by another shaft concentric with the low pressure shaft, the shafts being supported by bearings in a backbone structure that lies within the combustor. An engine of this type may be used as a jet engine or as a turbo-prop engine if the low pressure shaft is connected to a propeller through reduction gearing. A turbo-prop engine of this type develops high horsepower and operates at high rotational speeds, high temperatures and high pressures; for example, the engine shown herein has over 5,000 horsepower at 9,900 r.p.m. of the low pressure rotor and 12,500 r.p.m. of the high pressure rotor and has an overall compression ratio of over 10 to 1.

The high and low pressure rotors of the engine each have a bearing at each end of the combustor and these bearings are supported in the backbone structure which includes the inner shell of the combustor and which forms a compartmented area that serves as a sump for oil which has been distributed to the bearings through the rotor shafts. The compartmented backbone has labyrinth seals that enclose the bearings and the invention is particularly directed to feeding the high pressure compressor discharge air at a reduced pressure through the labyrinth seals and into the compartmented backbone to prevent oil from escaping therefrom. The backbone is thereby pressurized and is vented through a restrictor or metering orifice to the low pressure turbine for cooling purposes and for recouping the remaining pressure energy of the air. The high pressure compressor discharge air is reduced substantially in pressure before it is fed into the backbone by tapping the labyrinth seal at the compressor end of the backbone to the high pressure turbine area at the turbine end of the backbone. The backbone, the bearing supports, the labyrinth seals, the shafts and other members form a multitude of passages to properly direct the air and oil to confine the oil to the areas in the backbone that require lubrication.

In the drawings:

Figure 1 is a partial section through the central area of the engine showing the combustor, the backbone and the turbine and compressor rotors;

Figure 2 is an enlarged partial section at the compressor end of the backbone;

Figure 3 is an enlarged partial section at the turbine end of the backbone;

Figure 4 is an enlarged partial section of the bearing arrangement at the compressor end of the backbone; and Figure 5 is an enlarged partial section of the bearing arrangement at the turbine end of the backbone.

Referring now to the drawings and more particularly to Figure 1, the two-spool gas turbine engine has a low pressure rotor 10 that includes a hollow shaft 12 that drives the low pressure compressor (not shown) at its forward end and a low pressure turbine 14 which is secured to the aft end of the shaft by a splined sleeve 16. Antifriction roller bearings 18 and 20 support the low pressure rotor 10 within a high pressure rotor 22 which includes a hollow shaft 24 concentrically spaced about the inner shaft 12, a high pressure compressor rotor 26 secured to the shaft 24 by a splined sleeve 28, and a high pressure turbine wheel 30 which is secured to the aft end of the shaft 24. An antifriction thrust bearing 32 and an antifriction roller bearing 34 support the high pressure rotor 22 within the engine backbone 36 and the low pressure rotor 10 is in turn supported by the collar bearings 18 and 20. The engine backbone 36 includes three primary structural members which are the inner shell 38 of the combustor and the end rings 40 and 42 which support the bearings 32 and 34.

The front end ring 40 is a structural portion of a diffuser casing 44 which is connected to the outlet side of the high pressure compressor casing 46 and to the inlet side of the combustor 48. The diffuser 44 mounts the last vane row 50 of the compressor, a fuel nozzle 52 and forms a diffuser passage 54 that leads into the annular compressed air supply chamber 56 of the combustor 48. The annular air supply chamber 56 of the combustor 48 is formed by the backbone shell 38 and by an outer casing 58 and the chamber 56 is closed at its front end by the diffuser 44 and at its rear end by a transition casing portion 60 which includes an outer shell 62, a rear wall 64 and an inner ring 66 that supports the rear bearing support ring 42. A plurality of flame tubes 68 are arranged in a ring in the combustor air chamber 56 and each flame tube 68 consists of a number of sleeve sections which telescope together in spaced relation to provide a series of annular passages 70 that admit compressed air into the interior of the flame tube for combustion therein with fuel supplied by the nozzle 52.

The transition portions of the flame tubes 68 discharge through passages 72 through a turbine inlet nozzle 74 to the turbine blade system which includes a first stage turbine bucket row 76 on the high pressure turbine 30 and succeeding stage bucket rows 78 and 80 on the low pressure turbine 14, a turbine casing 82 being provided to house the turbine rotors and to support turbine stator vanes 84, 85 and 86 which carry diaphragms 88, 90 and 92 that extend to the turbine rotor to form labyrinth seals 94, 96 and 98 therewith.

It should be noted that the front face of the turbine wheel 30 forms a chamber 100 with the rear wall 64 of the combustor 48 and that this chamber is open to the turbine nozzle discharge at 102 so that the chamber 100 will be maintained at substantially the pressure of the turbine motive gases after expansion through the inlet nozzle 74. It should also be noted that the interior of the low pressure turbine rotor 14 forms a chamber 104 which communicates through passages 106 with the space behind the low pressure turbine blade row 78 at 108 so that the chamber 104 will be at substantially the same pressure as the turbine motive gases at 108. The pressure in the combustor air supply chamber 56 is substantially the same as the pressure immediately aft of the last stage compressor blade row 112 at 110. This pressure is, of course, much higher than the pressure at 102 because of the large pressure drop occurring in the turbine inlet nozzle 74. The pressure at 102 is likewise much higher than the pressure at 108 because of the large pressure drop occasioned by the intermediate blading 76, 84 and 78. An annular chamber 114 is formed by the aft wheel of the high pressure compressor rotor 26 and by a forward wall 116 of the diffuser 44. The chamber 114 is open to the discharge side of the high pressure compressor rotor 26 and receives compressed air therefrom at substantially the same pressure as at 110. It is thus seen that the chambers 114 and 56 contain compressed air at substantially the same pressure and that the chambers 100 and 104 are exposed to turbine exhaust gas at substantially lower pressures.

The chambers 100 and 104 are supplied with compressed air from the chamber 56 by a plurality of passages 118 (see Figure 3) that extend across the inner ring 66 of the transition portion 60 of the combustor 48. The chambers 100 and 104 also receive compressed air from the chamber 114 by passages to be described, but their primary source of air is from the chamber 56. The compressed air in the chamber 56 is at a much lower temperature than the turbine motive gases and accordingly cools the turbine rotors as it passes outwardly along the turbine wheels and into the flow path of the turbine, the turbine wheels being provided with suitable passages 120, 122, 106, 124 and 126 to allow the cooling air flow to take place as indicated by the arrows.

Referring now to the backbone structure that houses the shafts and bearings and more particularly to Figures 4 and 5, the forward end of the backbone shell 38 is closed by a pair of spaced concentric caps 128 and 130 which encircle the rotor shafts and which provide the stationary portion of a labyrinth seal 132 and a labyrinth seal 134, the running portions of the labyrinth seals being provided by a grooved sleeve 136 that is secured to the shaft portion of the high pressure compressor rotor 26 adjacent the bearing 32. A chamber 138 is formed between the caps 128 and 130 and opens between labyrinth seals 132 and 134. The chamber 138 is connected by conduits 140 and 142 to the chamber 100 at the forward face of the turbine so that the pressure in the chamber 138 will be at substantially the same pressure as is present in the chamber 100. There is a considerable pressure drop in the compressed air as it flows across the seal 132 from the chamber 114 to the chamber 138 because of the connection to the chamber 100 and this is an important aspect of the invention as will be seen. Air in the chamber 138 is also led (see Figure 2) by a conduit 144 to a chamber 146 which is formed by a pair of spaced rings 148 and 150 located in the backbone 36 immediately aft of the bearing 32. The rings 148 and 150 provide the stationary portion of a labyrinth seal 152 and 154, the running portions of which are provided by a grooved sleeve 156 which is similar to the sleeve 136 and which is also secured to the high pressure compressor rotor 26. The pressure in the chamber 146 is substantially the same as the pressure in the chamber 138 and it should be apparent that the labyrinth seals 134 and 152 are thus exposed to compressor discharge air at a pressure which is substantially the same as that in the chamber 100.

The labyrinth seals 134 and 152 are provided to confine oil which is supplied to the bearing 32 to the interior of the backbone 36. Oil is supplied to the bearing 32 through a pipe 158 which is mounted inside the shaft 12 and the oil is slung out of orifices 160 in the pipe 158 and through passages 162 in the shaft 12 into the interior of the compressor rotor shaft 26 and thence into the bearing 32 by passages 164. After passing through the bearing the oil is picked up by the rim portions of the sleeves 136 and 156 and is slung radially outward through passages 166 and 168 in the rim portions and into annular oil scavenge chambers 170 and 172 which remove the oil from the backbone 36 through a conduit 174 and conduct it to a scavenge pump, not shown. The outer peripheries of the rims of the sleeves 136 and 156 are provided with helical gear teeth 176 and 178. The gear teeth 176 and 178 have helix angles in the opposite sense; that is, the gear teeth 176 will have a clockwise helix angle if the gear teeth 178 have a counterclockwise helix angle, and are so arranged with respect to the direction of shaft rotation as to keep oil in the bearing chamber 180 and impel air into the bearing chamber from the chambers 182 and 184 at the exhaust sides of the seals 134 and 152 thereby preventing oil from leaking past the seals.

The air which is supplied to the bearing chamber 180 is vented to the chamber 104 in the low pressure turbine rotor through a restrictive orifice 186 which is located in an oil slinger ring assembly 188 for the aft bearing. The air leaving the bearing chamber 180 follows various paths in reaching the chamber 104; it leaves the forward side of the chamber 180 through a passage 190 in the sleeve 136, goes through a passage 192 in the rotor 26 and then flows past the bearing 18 into an annular chamber 194 that is formed between the concentric rotor shafts. A running seal 236 keeps the air from moving forwardly in the chamber 194. The air leaves the aft side of the bearing chamber 180 through a passage 196 in the rotor 26 and thence enters the annular chamber 194. Radial passages 162 in the rotor shaft 12 permit air from the chamber 194 to enter a chamber 200 and both chambers discharge through the orifice 186 into the chamber 104. Some of the air from the chamber 146 is directed rearwardly through the seal 154 and into an annular space 202 which is formed between the outer rotor shaft 24 and an insulating blanket casing 204 which is arranged within the backbone 36. The insulating casing 204 also forms an annular chamber 206 with the outer shell 38 of the backbone 36. The chamber 206 (see Figure 5) is directly connected to the chamber 100 through passages 208 formed in the rear rings 42 and 66 of the backbone. The annular chambers 138, 146 and 206 of the backbone are thus pressurized with compressed air at substantially the same pressure as the pressure of the chamber 100.

Referring more particularly to Figure 5 it is seen that the bearing arrangement in the aft end of the backbone 36 is similar to the bearing arrangement in the forward end. Oil is supplied to the bearings 34 and 20 by the oil tube 158 and the outer bearing 34 has a chamber 210 which is bounded on each side by grooved sleeves 212 and 214 which are secured to the outer shaft 24. The grooved sleeves or oil slingers exhaust oil from the bearing chamber 210 into annular oil scavenge chambers 216 and 218 and the oil is led by a conduit 221 in the sump or bottom of the backbone to the oil scavenge pump.

The sleeves or slingers 212 and 214 form a labyrinth seal 220 with the rearward portion of the insulating casing 204 and a labyrinth seal 222 with an insulating cap 224 that forms the rear wall of the backbone. Compressed air from the chamber 100 is led past the seal 222 and into the right side of the bearing chamber 210, this air being at substantially the same pressure as the air in the chambers 206 and 202 and air from the chambers 206 and 202 is led past the seal 220 and into the forward side of the bearing chamber 210. It is thus seen that the bearing chamber 210 is supplied with air at substantially the same pressure as was the bearing chamber 180.

A passage 226 in the shaft 24 discharges air from the aft side of the bearing chamber 210 and past the bearing 20 and into the annular chamber 194 just as air was discharged from the forward end of the bearing chamber 180 past the bearing 18 and into the annular chamber 194. The forward side of the bearing chamber 210 discharges air through passages 228 in the shaft 24 and into the annular chamber 194 and the air in the annular chamber 194 is then discharged into the chamber 200 of the shaft 12 through passages 198, the air in the chamber 200 discharging to the chamber 104 through the restrictor orifice 186 as previously described.

A grooved sleeve 230 is secured to the shaft 12 aft of the bearing 20 and forms a labyrinth seal 232 with the shaft 24 to prevent oil from leaking past the bearing and into the turbine. The sleeve 230 has helix gear teeth at the end adjacent the bearing 20 and is supplied with compressed air from the chamber 100 by passage 234 in the shaft 24.

From the foregoing it is readily seen that the invention provides a means whereby compressed air at a pressure substantially equal to the exhaust pressure of the first turbine nozzle is supplied to the labyrinth seals on each side of each group of bearings in the backbone and is then discharged from the backbone through a common restrictor orifice into a lower pressure flow path area of the turbine. The arrangement prevents oil from leaking through the labyrinth seals and retains the oil for each bearing group at the particular bearing group. The air that is bled from the compressor is not wasted for it serves to cool the turbine rotors which in turn extract whatever pressure energy remains in the air. The air flow through the backbone should be kept at a minimum consistent with the prevention of oil leakage as the compressor discharge air is at a high temperature, being in the particular engine in the neighborhood of 700 degrees Fahrenheit. The resistor orifice provides a ready means to achieve correct air flow. To assist in understanding the invention the absolute static pressure in inches of mercury of some of the chambers under normal engine operating conditions are about 352 inches in chamber 114, 205 inches in chamber 138, 203 inches in chamber 180, 204 inches in chamber 146, 202.5 inches in chamber 194, 203.5 inches in chamber 202, 203.5 inches in chamber 206, 202 inches in chamber 200, 203 inches in chamber 210, 204 inches in chamber 100, 95 inches in chamber 104, and 352 inches in chamber 56.

While the preferred embodiment of the invention has been described fully in order to explain the principles of the invention, it is to be understood that modifications of structure may be made by the exercise of skill in the art within the scope of the invention which is not to be regarded as limited by the detailed description of the preferred embodiment.

We claim:

1. A gas turbine engine comprising a gas turbine having high and low pressure stages, a combustor for supplying hot motive gases to the turbine, an air compressor for supplying compressed air to the combustor, a backbone housing within the combustor extending between the turbine and compressor, shafting within the housing extending therethrough and connecting the turbine to the compressor to drive the same, bearings for the shafting and oil spray means for the bearings within each end of the housing, means forming chambers outside each end of the housing, means providing each chamber with communication with the compressor discharge air and with the turbine motive gases at a high pressure stage whereby each chamber will contain compressor discharge air enroute to the turbine, seals for the shafting at each end of the housing separating the bearings at each end of the housing from the respective chambers, the interior of the housing being in communication with the respective chambers across the respective seals whereby the housing will be supplied with compressor discharge air, and a flow restrictor carried by the shafting and in communication with the interior of the housing and with a low pressure stage of the turbine so as to vent the interior of the housing to the turbine motive gases at the low pressure stage.

2. Apparatus in accordance with claim 1 wherein the shafting seals are labyrinth seals and the means providing each chamber with communication with the compressor discharge air and with the turbine motive gases at a high pressure stage includes a passage connecting the chamber at the turbine end of the housing to an intermediate location in the labyrinth seal at the compressor end of the housing whereby the labyrinth seals at both ends of the housing work against the same air pressure.

References Cited in the file of this patent
UNITED STATES PATENTS

| | | |
|---|---|---|
| 2,613,498 | Prendergast | Oct. 14, 1952 |
| 2,614,386 | McLeod et al. | Oct. 21, 1952 |
| 2,791,090 | Hooker | May 7, 1957 |